United States Patent
Kuehne et al.

(10) Patent No.: US 10,162,411 B2
(45) Date of Patent: Dec. 25, 2018

(54) METHODS AND SYSTEM FOR OPERATING AT LEAST ONE DISPLAY DEVICE OF A MOTOR VEHICLE, AND MOTOR VEHICLE COMPRISING A SYSTEM FOR OPERATING AT LEAST ONE DISPLAY DEVICE

(71) Applicant: AUDI AG, Ingolstadt (DE)

(72) Inventors: Marcus Kuehne, Beilngries (DE); Ulrich Mueller, Ingolstadt (DE); Johann Schneider, Wettstetten (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/021,670

(22) PCT Filed: Sep. 17, 2014

(86) PCT No.: PCT/EP2014/002513
§ 371 (c)(1),
(2) Date: Mar. 11, 2016

(87) PCT Pub. No.: WO2015/039746
PCT Pub. Date: Mar. 26, 2015

(65) Prior Publication Data
US 2016/0224108 A1    Aug. 4, 2016

(30) Foreign Application Priority Data
Sep. 20, 2013    (DE) .................. 10 2013 015 634

(51) Int. Cl.
*G06F 3/01*    (2006.01)
*B60K 35/00*    (2006.01)
(Continued)

(52) U.S. Cl.
CPC .............. *G06F 3/013* (2013.01); *B60K 35/00* (2013.01); *B60K 37/02* (2013.01); *G06F 3/0482* (2013.01);
(Continued)

(58) Field of Classification Search
CPC ...................................................... G06F 3/013
See application file for complete search history.

(56) References Cited

U.S. PATENT DOCUMENTS 6,577,329 B1 * 6/2003 Flickner ................. G06Q 30/02
715/774
2008/0101656 A1    5/2008 Barnes et al.
(Continued)

FOREIGN PATENT DOCUMENTS

DE    102007025531 A1    12/2008
DE    102007026120 A1    12/2008
(Continued)

OTHER PUBLICATIONS

Decision to Grant for German Appln. No. 102013015634.3 dated Feb. 27, 2015.
(Continued)

*Primary Examiner* — William Boddie
*Assistant Examiner* — Andrew Schnirel
(74) *Attorney, Agent, or Firm* — Staas & Halsey LLP

(57) ABSTRACT

In a motor vehicle, having at least one display device, a gaze direction of a vehicle occupant of the motor vehicle is detected and used to check whether the vehicle occupant has directed his gaze to a display region of the display device for at least a predefined gazing duration. If the gaze has been directed to the display region of the display device for at least the predefined gazing duration, an interaction mode of an operating device for controlling the display device is activated After the interaction mode has been activated, at least one predetermined criterion is used to determine whether control of the display device has been concluded. The interaction mode is maintained as long as it has been
(Continued)

determined that the control of the display device has not been concluded or at least one other predetermined criterion has not yet been satisfied.

10 Claims, 2 Drawing Sheets

(51) Int. Cl.

| | | |
|---|---|---|
| *B60K 37/02* | (2006.01) | |
| *G06F 3/0482* | (2013.01) | |
| *G06F 3/0484* | (2013.01) | |
| *G06F 3/14* | (2006.01) | |
| *G09G 5/14* | (2006.01) | |

(52) U.S. Cl.
CPC ........ *G06F 3/04842* (2013.01); *G06F 3/1423* (2013.01); *G09G 5/14* (2013.01); *B60K 2350/1052* (2013.01); *B60K 2350/2013* (2013.01); *G09G 2380/10* (2013.01)

(56) References Cited

U.S. PATENT DOCUMENTS

| | | | | |
|---|---|---|---|---|
| 2008/0240519 A1* | 10/2008 | Nagamitsu | .............. | G06F 3/012 382/118 |
| 2009/0167682 A1* | 7/2009 | Yamashita | ............. | G01C 21/36 345/158 |
| 2009/0231145 A1* | 9/2009 | Wada | ................. | A61B 5/02416 340/575 |
| 2009/0312059 A1 | 12/2009 | Pratt et al. | | |
| 2010/0238280 A1* | 9/2010 | Ishii | ....................... | B60K 35/00 348/77 |
| 2012/0300061 A1* | 11/2012 | Osman | .................. | G06F 1/3231 348/135 |
| 2013/0063596 A1* | 3/2013 | Ueda | ....................... | B60R 16/02 348/148 |
| 2014/0237366 A1* | 8/2014 | Poulos | .................... | G06F 3/013 715/728 |

FOREIGN PATENT DOCUMENTS

| | | |
|---|---|---|
| DE | 102007049710 A1 | 4/2009 |
| DE | 102007061537 A1 | 7/2009 |
| DE | 102009041187 A1 | 2/2011 |
| DE | 102012006966 A1 | 11/2012 |
| DE | 102013015634.3 | 9/2013 |
| DE | 102012215407 A1 | 5/2014 |
| DE | 102013000744 A1 | 7/2014 |
| DE | 102013003059 A1 | 8/2014 |
| EP | 1 562 102 A2 | 8/2005 |
| EP | 2 390 139 A1 | 11/2011 |
| WO | 2012/162060 A2 | 11/2012 |
| WO | PCT/EP/2014/002513 | 9/2014 |

OTHER PUBLICATIONS

International Search Report for PCT/EP2014/002513 dated Dec. 17, 2014.
German Office Action for Appln. No. 102013015634.3 dated Oct. 20, 2014.
Office Action dated Oct. 27, 2016 in corresponding Chinese Patent Application No. 201480051606.6.
Chinese Office Action dated Nov. 7, 2017 in corresponding Chinese Patent Application No. 201480051606.6.
WIPO translation of International Preliminary Examination Report on Patentability for PCT/EP2014/002513 dated Mar. 24, 2016.

* cited by examiner

METHODS AND SYSTEM FOR OPERATING AT LEAST ONE DISPLAY DEVICE OF A MOTOR VEHICLE, AND MOTOR VEHICLE COMPRISING A SYSTEM FOR OPERATING AT LEAST ONE DISPLAY DEVICE

CROSS REFERENCE TO RELATED APPLICATIONS

This application is the U.S. national stage of International Application No. PCT/EP2014/002513, filed Sep. 17, 2014 and claims the benefit thereof. The International Application claims the benefit of German Application No. 102013015634.3 filed on Sep. 20, 2013, both applications are incorporated by reference herein in their entirety.

BACKGROUND

Described below are a method and a system for operating at least one display device of a motor vehicle and a motor vehicle having a system for operating at least one display device.

DE 10 2007 049 710 A1 shows a method for visually triggering processes in a motor vehicle. An operating element is automatically initiated as soon as it has been detected that a vehicle occupant has directed his gaze to the operating element of the motor vehicle for a predefined duration.

DE 10 2012 006 966 A1 shows a method for triggering a function which can be carried out in the vehicle by gaze-controlled operation by a driver of the motor vehicle. A gaze detection device is used to check whether the driver has directed his gaze to a particular region of a display area of an operating panel. If it has been determined that the gaze is turned in this manner, a function which can be carried out in the vehicle and is associated with the operating panel is carried out. The display area can be deactivated in this case as soon as it has been detected that the gaze is averted from the corresponding display area.

EP 2 390 139 A1 shows a method for illuminating particular regions in a vehicle interior on the basis of the gaze direction. As soon as it has been detected that a driver of the motor vehicle has directed his gaze to one of the regions for a predefined duration, this region is illuminated. If the driver continues to look at this region for a predefined duration, the illumination intensity is increased.

EP 1 562 102 A2 shows a motor vehicle with function triggering by gaze selection. An operating element can be activated as soon as it has been detected that a vehicle occupant turns his gaze to the operating element.

DE 10 2007 025 531 A1 shows a display system controlled by the gaze direction and a display method controlled by the gaze direction for a motor vehicle. In this case, respectively displayed information can be changed on the basis of a detected gaze direction duration.

SUMMARY

Described below is a method to improve the operability of at least one display device which can be controlled on the basis of the gaze direction.

In the method described below for operating at least one display device of a motor vehicle, a gaze direction of a vehicle occupant of the motor vehicle is detected and the detected gaze direction is used to check whether the vehicle occupant has directed his gaze to a display region of the display device for at least a predefined gazing duration. If the gaze has been directed to the display region of the display device for at least the predefined duration, an interaction mode is activated in which an operating device for controlling the display device is activated. The method is distinguished by the fact that, after the interaction mode has been activated, at least one predetermined criterion is used to determine whether control of the display device has been concluded. The interaction mode is maintained as long as it has been determined that the control of the display device has not been concluded or at least one other predetermined criterion has not yet been satisfied.

In the case of display devices in which a corresponding interaction mode for controlling the display device can be activated in a manner controlled by the gaze direction, undesirable starting or else deactivation of the relevant interaction mode may result if, for example, it is detected that the vehicle occupant's gaze is averted from the previously activated display device. As a result of the fact that the invention provides for the relevant interaction mode to be maintained as long as it has been determined that the control of the display device has not been concluded, undesirable changeover or deactivation of the relevant interaction mode can be prevented for the display device currently activated by the user in a manner controlled by the gaze direction.

In the method, it is not just the display device itself which is controlled. The display device is used as a user interface for one or more different functions of the motor vehicle, for example in the form of an on-board computer, a navigation device, a radio or the like. In the interaction mode, provided that it is activated, the driver can therefore use the operating device to control respective vehicle functions via the display device, the display device visualizing the control options and the control operations which are possibly carried out.

One advantageous configuration provides for the monitoring for determining whether control of the display device has been concluded to be carried out only as soon as it has been detected that the gaze of the vehicle occupant is averted from the display region of the display device. This is because, as long as it is detected that the vehicle occupant has still directed his gaze to the display region of the relevant display device, it can be assumed with reasonable certainty that the vehicle occupant also wishes to interact with the display device. The monitoring effort can accordingly be reduced as a result of the fact that the monitoring for determining whether control of the display device has been concluded is carried out only as soon as it has been detected that the gaze of the vehicle occupant is averted.

Another advantageous configuration provides for activation of a further interaction mode, in which the operating device or another operating device for controlling a further display device is activated, to be prevented if it is detected that the gaze of the vehicle occupant is turned to a display region of the further display device for a predefined gazing duration, as long as it has been detected that the control of the display device has not been concluded. In other words, interaction of the vehicle occupant with a further display device of the motor vehicle is therefore prevented as long as it has not been detected that the vehicle occupant has concluded control of the display device previously changed to the interaction mode. This prevents undesirable switching back and forth of the interaction modes between the different display devices if it can be assumed that the vehicle occupant still also wishes to control the display device previously changed to the interaction mode.

Another alternative advantageous embodiment provides for activation of a further interaction mode, in which the operating device or another operating device for controlling a further display device is activated, to be delayed by a predefined duration after it has been detected that the gaze of the vehicle occupant is turned to a display region of the further display device for a predefined gazing duration, as long as it has been detected that the control of the display device has not been concluded. In other words, the relevant interaction mode of the further operating device is therefore only started in a delayed manner if the gaze is accordingly turned, as long as it has been detected that the control of the display device previously changed to the interaction mode has not been concluded. This temporally delayed starting of the interaction mode for the further operating device if it is accordingly detected that the gaze is turned prevents premature and possibly undesirable changeover of the interaction mode from one display device to the other.

Another advantageous embodiment provides for the interaction mode of the display device to be ended as soon as the further interaction mode of the further display device is activated. Therefore, the relevant interaction mode is only ever activated or kept activated for one display device, with the result that there is no unnecessary confusion of the vehicle occupant when operating the different display devices. Multiple operability of a plurality of display devices is therefore prevented.

In order to determine whether the control of the display device or of the further display devices has been concluded, another advantageous embodiment provides for it to be detected whether the operating device is still actuated. It is therefore possible to easily and reliably determine whether the vehicle occupant has already concluded the control of the relevant display device.

If a plurality of selectable options are displayed using the display device or the further display devices, in order to determine whether the control of the display device or of the further display devices has been concluded, another advantageous configuration provides for it to be detected whether one of the options has been selected after activating the interaction mode. For example, the display device can be used to display a plurality of different radio stations between which the vehicle occupant can choose and can accordingly select a radio station which has hitherto not yet been activated. In the example, it is not yet assumed that the control or driving of the display device has been concluded as long as a radio station which has not yet been previously selected has not been selected by the vehicle occupant. This makes it possible to determine, in a particularly reliable manner, whether the control of the relevant display device by the vehicle occupant has been concluded since a corresponding selection by the vehicle occupant can usually be expected if he is provided with a display of a plurality of selectable options by the display device.

In order to determine whether the control of the display device or of the further display devices has been concluded, another advantageous embodiment provides for it to be detected whether actuation of the operating device has ceased for a predefined duration. In particular, if the display device is used to display contents which can be used only with difficulty to assess whether the vehicle occupant has currently concluded control of the display device, for example if a map section of a navigation system is displayed, into or from which the vehicle occupant can zoom in or out, for example, it is appropriate to infer that the action of controlling the relevant display device has probably been concluded if actuation of the operating device has ceased for the predefined duration.

Another advantageous configuration provides for the duration to be predefined on the basis of contents displayed using the display device. If, for example, the intention is to use the display device to display relatively complex contents which require a certain comprehension duration before the vehicle occupant has completely perceived or comprehended the contents, it is appropriate to increase the duration for which no actuation of the operating device results in the conclusion that the action of controlling the display device has been concluded and vice versa. This makes it possible to achieve a particularly reliable statement with regard to the conclusion of an action of controlling the relevant display device.

The system described below for operating at least one display device of a motor vehicle has a gaze detection device which is designed to detect a gaze direction of a vehicle occupant of the motor vehicle and to use the detected gaze direction to check whether the vehicle occupant has directed his gaze to a display region of the display device for at least a predefined gazing duration. The system also has a control device which is designed to activate an interaction mode, in which an operating device of the system for controlling the display device is activated, if it is determined that the gaze of the vehicle occupant is turned to the display region of the display device for at least the predefined gazing duration. The system described below is distinguished by the fact that, after the interaction mode has been activated, the control device is designed to use at least one predetermined criterion to determine whether control of the display device has been concluded. The control device is also designed to maintain the interaction mode as long as it has been determined that the control of the display device has not been concluded or at least one other predetermined criterion has not yet been satisfied. Advantageous configurations of the method can be considered to be advantageous configurations of the system, in which case the system includes means for carrying out the method.

BRIEF DESCRIPTION OF THE DRAWINGS

Further advantages, features and details of the invention emerge from the following description of exemplary embodiments and on the basis of the drawings. The features and combinations of features mentioned in the description above and the features and combinations of features mentioned in the description of the figures below and/or shown in the figures alone can be used not only in the respectively stated combination but also in other combinations or else alone without departing from the scope of the invention.

For a further description, reference is made to the exemplary embodiments in the accompanying drawings of which.

DETAILED DESCRIPTION OF THE PREFERRED EMBODIMENT

Figure 1:
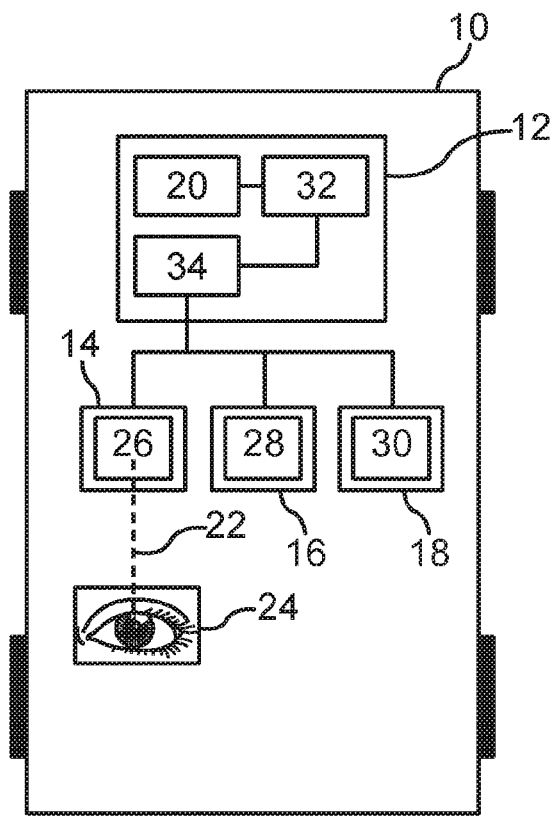
FIG. 1 is a schematic block diagram of a motor vehicle having a system for operating three display devices of the motor vehicle on the basis of the gaze direction.

Reference will now be made in detail to the preferred embodiments, examples of which are illustrated in the accompanying drawings, wherein like reference numerals refer to like elements throughout.

A motor vehicle 10 having a system 12 for operating a plurality of display devices 14, 16, 18 on the basis of the gaze direction is shown in a schematic illustration in FIG. 1. The system 12 has a gaze detection device 20 which is designed to detect a gaze direction of a vehicle occupant 24 of the motor vehicle 10, which gaze direction is indicated using the dashed line 22, and to use the detected gaze direction 22 to check whether the vehicle occupant 24 has directed his gaze to one of the display regions 26, 28, 30 of the respective display devices 14, 16, 18 for at least a predefined duration.

The system 12 also has a control device 32 which is designed to activate an interaction mode, in which an operating device 34 of the system 12 for controlling the relevant display device 14, 16, 18 is activated, if it is determined that the gaze of the vehicle occupant 24 is turned to one of the display regions 26, 28, 30 for at least the predefined gazing duration. In this case, the control device 32 is coupled to the gaze detection device 20, thus ensuring a corresponding flow of information from the gaze detection device 20 to the control device 32.

After the relevant interaction mode has been activated, the control device 32 is designed to use at least one predetermined criterion to determine whether control of the corresponding display device 14, 16, 18 has been concluded. The control device 34 is designed to maintain the relevant interaction mode as long as it has been determined that the control of the corresponding display device 14, 16, 18 has not been concluded or at least one differently predetermined criterion has been satisfied.

Figure 2:
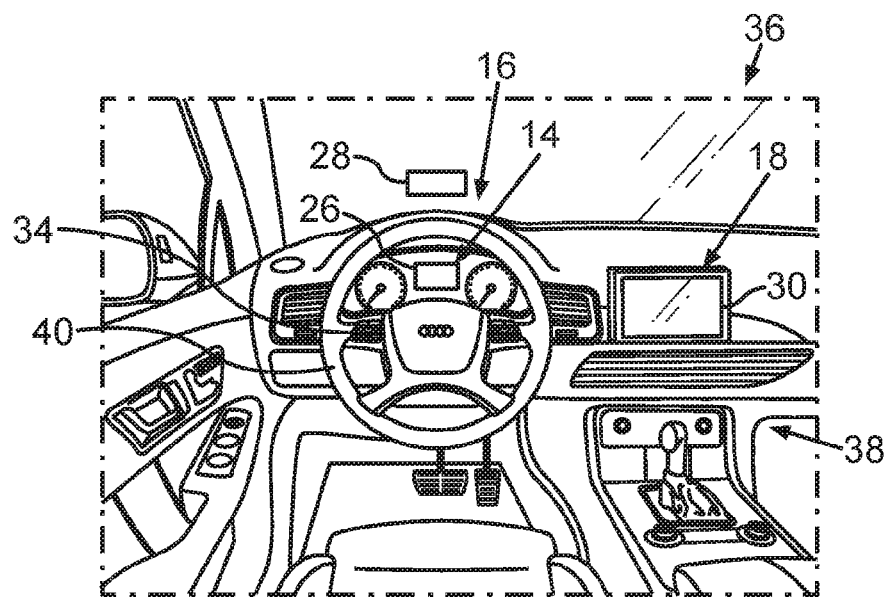
FIG. 2 is a perspective view of a partially illustrated cockpit of the motor vehicle, the display devices being in the form of a combination instrument, a head-up display and a display above a center console of the motor vehicle.

FIG. 2 illustrates a section of a cockpit 36 of the motor vehicle 10. In the case shown here, the display device 14 is in the form of a combination instrument, the display device 16 is in the form of a head-up display, and the display device 18 is in the form of a display arranged above a center console 38 of the motor vehicle 10.

A method for operating the display devices 14, 16, 18 on the basis of the gaze direction is explained in more detail below. The gaze detection device 20 is used to continuously detect the gaze direction 22 of the vehicle occupant 24. The detected gaze direction 22 is used to check whether the vehicle occupant 24 has directed his gaze to one of the display regions 26, 28, 30 of the display devices 14, 16, 18 for at least a predefined duration, for example one second, two seconds or the like.

If the gaze has been directed to one of the display regions 26, 28, 30 for at least the predefined gazing duration, the control unit 32 activates a corresponding interaction mode in which the operating device 34 for controlling the relevant display device 14, 16, 18 is activated.

In the case shown here, the operating device 34 is in the form of a cylindrical element which is arranged on a steering wheel 40 of the motor vehicle 10. In the present case, the vehicle occupant 24 is therefore a driver of the motor vehicle 10 who can operate the different display devices 14, 16, 18 by the operating device 34 in a manner controlled by the gaze direction without having to remove his hands from the steering wheel 40 as soon as the relevant display device 14, 16, 18 has been changed to the interaction mode.

It is initially assumed below that the vehicle occupant 24 has accordingly directed his gaze to the display region 26 of the combination instrument 14 for a sufficiently long time. The corresponding interaction mode for the combination instrument 14 is consequently activated, in which the vehicle occupant 24 can control the combination instrument 14 by accordingly actuating or operating the operating device 34.

After the interaction mode for the combination instrument 14 has been activated, it is continuously determined whether control of the combination instrument 14 has been concluded. The interaction mode for the combination instrument 14 is maintained as long as it has been determined that the control of the combination instrument 14 has not been concluded or a further criterion, which is also discussed below, has been satisfied.

The monitoring for determining whether control of the combination instrument 14 has been concluded is carried out only as soon as it has been detected that the gaze of the vehicle occupant 24 is averted from the display region 26 of the combination instrument 14. This is because, as long as the vehicle occupant 24 has directed his gaze to the display region 26 of the combination instrument 14 anyway, it is assumed that the vehicle occupant 24 would still like to interact with the combination instrument 14.

Figure 3:
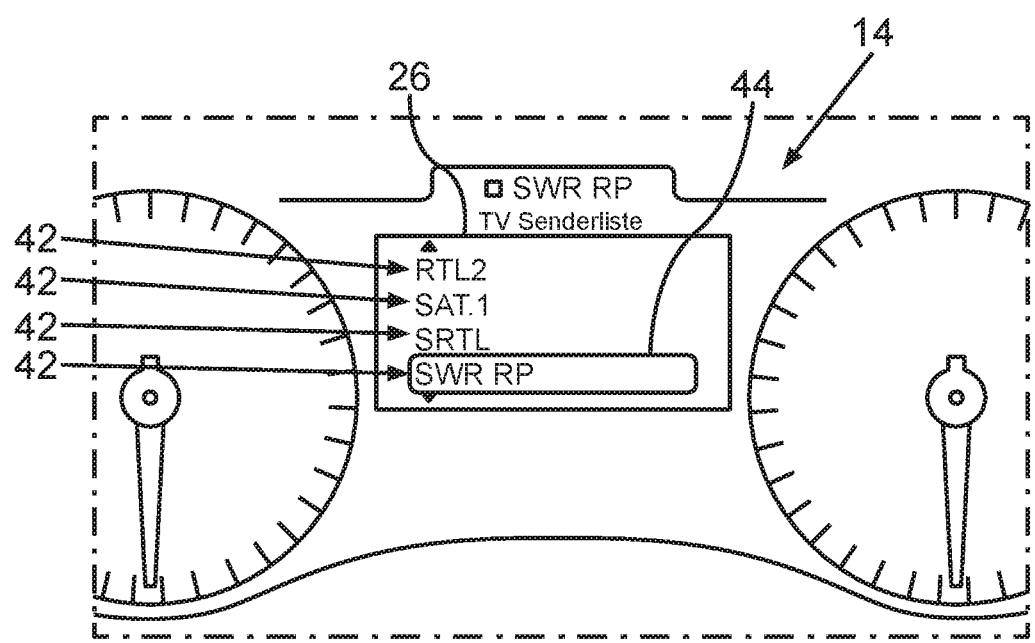
FIG. 3 is a simplified front view of the combination instrument of the motor vehicle, with a plurality of different TV stations being displayed in the display region thereof.

FIG. 3 shows the combination instrument 14 in an enlarged illustration, in which case a plurality of selectable options 42 in the form of respective TV stations are displayed. During the activated interaction mode, the vehicle occupant 24 can change between the different options 42 by accordingly actuating the operating device 34, in which case the TV station "SWR RP" is currently selected in the case shown here, which is marked by the border 44. In order to determine whether the control of the combination instrument 14 by the vehicle occupant 24 has been concluded, it is detected in the present case whether one of the options 42 has been selected after activating the interaction mode. Specifically, this means that, as long as the vehicle occupant 24 has not changed the previously selected station "SWR RP", it is assumed that the control of the combination instrument 14 has not yet been concluded.

Furthermore, in order to determine whether the control of the combination instrument 14 has been concluded, it is detected whether actuation of the operating device 34 has ceased for a predefined duration, for example five seconds, ten seconds or the like. This is because, if the vehicle occupant 24 does not select another station in the form of the options 42, for example, and also does not do this within the predefined duration after activation of the interaction mode, it is assumed that the control of the combination instrument 14 is now ended.

Instead of the situation in the case shown here, the combination instrument 14 could also be used to display contents more complex than a list of TV stations, for example different navigation contents, on-board computer contents or the like, in which case the corresponding predefined duration, during which actuation of the operating device 34 must cease before termination of the control of the combination instrument 14 is assumed, is predefined on the basis of the contents currently displayed or their complexity.

If the vehicle occupant 24 now still looks at the display region 28 of the head-up display 16, for example, during the activated interaction mode for the combination instrument 14, a correspondingly further interaction mode, in which the operating device 34 or else another operating device for controlling the head-up display 16 is activated, is prevented if it is detected that the gaze of the vehicle occupant 24 is turned to the display region 28 of the head-up display 16 for a predefined gazing duration, as long as it has been detected that the control of the combination instrument 14 has not been concluded.

Alternatively, it is also possible, when the display region 28 of the head-up display 16 is focused on for an accordingly long time, to delay at least starting or activation of a corresponding interaction mode, in which the vehicle occupant 24 can control the head-up display 16 using the operating device 34, by a predefined duration, for example 5 seconds, 10 seconds or the like, as long as it has been detected that the control of the combination instrument 14 has not been concluded.

The situation is just the same with the display 18 which is arranged above the region of the center console 38 and can be changed to a corresponding interaction mode as soon as it has been detected that the vehicle occupant 24 has focused on the display region 30 of the display 18 at least for the predefined gazing duration. Activation of a corresponding interaction mode, in which the vehicle occupant 24 can interact with the display 18, may likewise be accordingly delayed or else prevented as long as it has been detected that an operating action or control of the combination instrument 14 has not been concluded.

As soon as an interaction mode for one of the display devices 14, 16, 18 is activated, the previously activated interaction mode of one of the other display devices 14, 16, 18 is deactivated. In other words, the vehicle occupant 24 can therefore only ever interact with one of the display devices 14, 16, 18 by accordingly actuating the operating device 34.

In the interaction modes, the display devices 14, 16, 18 are not purely controlled and displayed contents accordingly changed or manipulated. Rather, the display devices 14, 16, 18 are used as graphical user interfaces which can be used by the vehicle occupant 24 to access a wide variety of vehicle functions, for example a radio, a navigation device, an on-board computer, by accordingly actuating or controlling the operating device 34.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method for operating at least one display device of a motor vehicle, each display device having a display region, said method comprising:
    detecting a gaze direction of a gaze of a vehicle occupant of the motor vehicle;
    using the gaze direction to check whether the gaze of the vehicle occupant has been directed gaze to the display region of a first display device for at least a first predefined gazing duration;
    activating a first interaction mode, when the gaze of the vehicle occupant has been directed to the display region of the first display device for at least the first predefined gazing duration, an operating device for controlling the first display device being activated in the first interaction mode;
    determining, after the first interaction mode has been activated using at least one predetermined criterion, whether control of the motor vehicle using information displayed by the first display device has been concluded;
    maintaining the first interaction mode as long as said determining determines that the control of the motor vehicle using information displayed by the first display device has not been concluded unless at least one other predetermined criterion has been satisfied; and
    delaying activation of a second interaction mode, one of the operating device and another operating device controlling a second display device being activated in the second interaction mode, by a predefined delay duration after detection that the gaze of the vehicle occupant is directed to the display region of the second display device for a second predefined gazing duration, when the control of the motor vehicle using information displayed by the first display device has not been concluded.

2. The method as claimed in claim 1, wherein said determining whether control of the first display device has been concluded begins upon detection that the gaze of the vehicle occupant is averted from the display region of the first display device.

3. The method as claimed in claim 1, further comprising ending the first interaction mode of the first display device as soon as the second interaction mode of the second display device is activated.

4. The method as claimed in claim 1, wherein said determining whether the control of the first display device has been concluded and determining whether the second display device has been concluded are based on whether the operating device is still actuated.

5. The method as claimed in claim 1, wherein when selectable options are displayed using one of the first and second display devices, said determining whether the control of the one of the first and second display devices has been concluded is based on whether one of the selectable options has been selected after said activating of one of the first and second interaction modes, respectively.

6. The method as claimed in claim 1, wherein said determining whether the control of one of the first and second display devices has been concluded, is based on whether actuation of the operating device has ceased for a predefined cessation duration.

7. The method as claimed in claim 6, wherein the predefined cessation duration is based on contents displayed using the one of the first and second display devices.

8. A system including at least one operating device for operating at least first and second display devices of a motor vehicle, each of the display devices having a display region, said system comprising:
    a gaze detection device detecting a gaze direction of a vehicle occupant of the motor vehicle and a duration of the gaze direction, and checking whether a gaze of the vehicle occupant has been directed to the display region of the first display device for at least a first predefined gazing duration; and
    a control device
        activating, in a first interaction mode, the operating device controlling the first display device upon determining that the gaze of the vehicle occupant is directed to the display region of the first display device for at least the first predefined gazing duration,
        determining, after the first interaction mode has been activated using at least one predetermined criterion, whether control of the motor vehicle using information displayed by the first display device has been concluded,
        maintaining the first interaction mode as long as the control of the motor vehicle using information displayed by the first display device has not been concluded unless at least one other predetermined criterion has been satisfied, and
        delaying activation of a second interaction mode, one of the operating device and another operating device controlling a second display device being activated in the second interaction mode, by a predefined duration after detection that the gaze of the vehicle occupant is directed to the display region of the second display device for a second predefined gazing duration, when the control of the motor vehicle using information displayed by the first display device has not been concluded.

9. A motor vehicle having an occupant, comprising:

first and second display devices, each having a display region;

at least one operating device operating the display devices;

a gaze detection device detecting a gaze direction of the driver of the motor vehicle and a duration of the gaze direction, and checking whether a gaze of the driver has been directed to the display region of a first display devices for at least a first predefined gazing duration; and a control device activating, in a first interaction mode, the at least one operating device controlling the first display device upon determining that the gaze of the occupant is directed to the display region of the first display device for at least the first predefined gazing duration, determining, after the first interaction mode has been activated, whether control of the motor vehicle using information displayed by the first display device has been concluded based on at least one predetermined criterion, maintaining the first interaction mode as long as the control of the motor vehicle using information displayed by the display device has not been concluded unless at least one other predetermined criterion has been satisfied, and delaying activation, in a second interaction mode of the at least one operating device controlling a second display device, by a predefined duration after detection that the gaze of the occupant is directed to the display region of the second display device for a second predefined gazing duration, when the control of the motor vehicle using information displayed by the first display device has not been concluded.

10. The method as claimed in claim 1, wherein said determining whether control of the motor vehicle using information displayed by the first display device has been concluded includes detecting selection of an option displayed by the first display device.

* * * * *

UNITED STATES PATENT AND TRADEMARK OFFICE
CERTIFICATE OF CORRECTION

PATENT NO. : 10,162,411 B2  
APPLICATION NO. : 15/021670  
DATED : December 25, 2018  
INVENTOR(S) : Marcus Kuehne et al.

Page 1 of 1

It is certified that error appears in the above-identified patent and that said Letters Patent is hereby corrected as shown below:

In the Claims

Column 7, Line 47:
Claim 1, delete "gaze to" and insert -- to --, therefor.

Column 9, Line 17:
Claim 9, delete "devices" and insert -- device --, therefor.

Signed and Sealed this
Twenty-sixth Day of February, 2019

Andrei Iancu
*Director of the United States Patent and Trademark Office*